United States Patent [19]

Close

[11] 3,789,957
[45] Feb. 5, 1974

[54] CHECK OUT SYSTEM

[76] Inventor: James Garth Close, Box 3096, Lubbock, Tex. 79410

[22] Filed: Apr. 5, 1972

[21] Appl. No.: 241,279

[52] U.S. Cl............................ 186/1 AC, 280/33.99
[51] Int. Cl............................................... E04h 3/04
[58] Field of Search............ 186/1, 1 A, 1 AC, 1 R; 280/33.99

[56] References Cited
UNITED STATES PATENTS

| | | | |
|---|---|---|---|
| 3,517,773 | 6/1970 | Swanson | 186/1 AC |
| 2,722,287 | 11/1955 | Beinhorn | 186/1 AC |
| 3,011,593 | 12/1961 | Foster | 186/1 AC |
| 3,645,554 | 2/1972 | Stein | 186/1 AC |
| 3,678,660 | 7/1972 | Musser | 186/1 AC |
| 2,596,686 | 5/1952 | Hess | 186/1 AC |
| 2,980,212 | 4/1961 | Foster | 186/1 AC |

Primary Examiner—Richard E. Aegerter
Assistant Examiner—H. S. Lane
Attorney, Agent, or Firm—D. Carl Richards et al.

[57] ABSTRACT

A check out system for a supermarket, or other retail merchandise store or the like, having a cooperating shopping cart and check out counter. The check out counter is provided with a horizontal check out surface which is elevated above the floor at a convenient work height. This surface can support apparatus such as scales, or be provided with conveyors in the surface thereof for moving merchandise. The check out surface is also provided with a centrally located groove which extends along the length thereof, the groove being narrow enough in width so that ordinary merchandise will not fall therein. Located below the groove is a clearance area which extends the length of the check out counter. This area has an inclined ramp surface for supporting a check out cart therein. A check out cart is provided with an undercarriage portion having a plurality of rotatable wheels thereon for allowing the cart to move over the surface of the store or supermarket, as required. Also attached to the undercarriage is an auxiliary merchandise receiving portion and a narrow upstanding support to which is pivotably attached an upper basket portion for receiving merchandise and the like. The merchandise cart is provided with a foldable infant seat assembly for use in transporting infants about the store. The carts are also provided with means for allowing the carts to nest together to reduce the storage space required therefor. The upstanding support on the cart is such a size that it will slide through the groove with the undercarriage portion moving through the clearance area and the upper basket portion being supported above the upper surface of the counter. Also, the upper basket portion is provided with a vertically swinging door in the side thereof which allows easy access to the interior of the basket portion.

20 Claims, 17 Drawing Figures

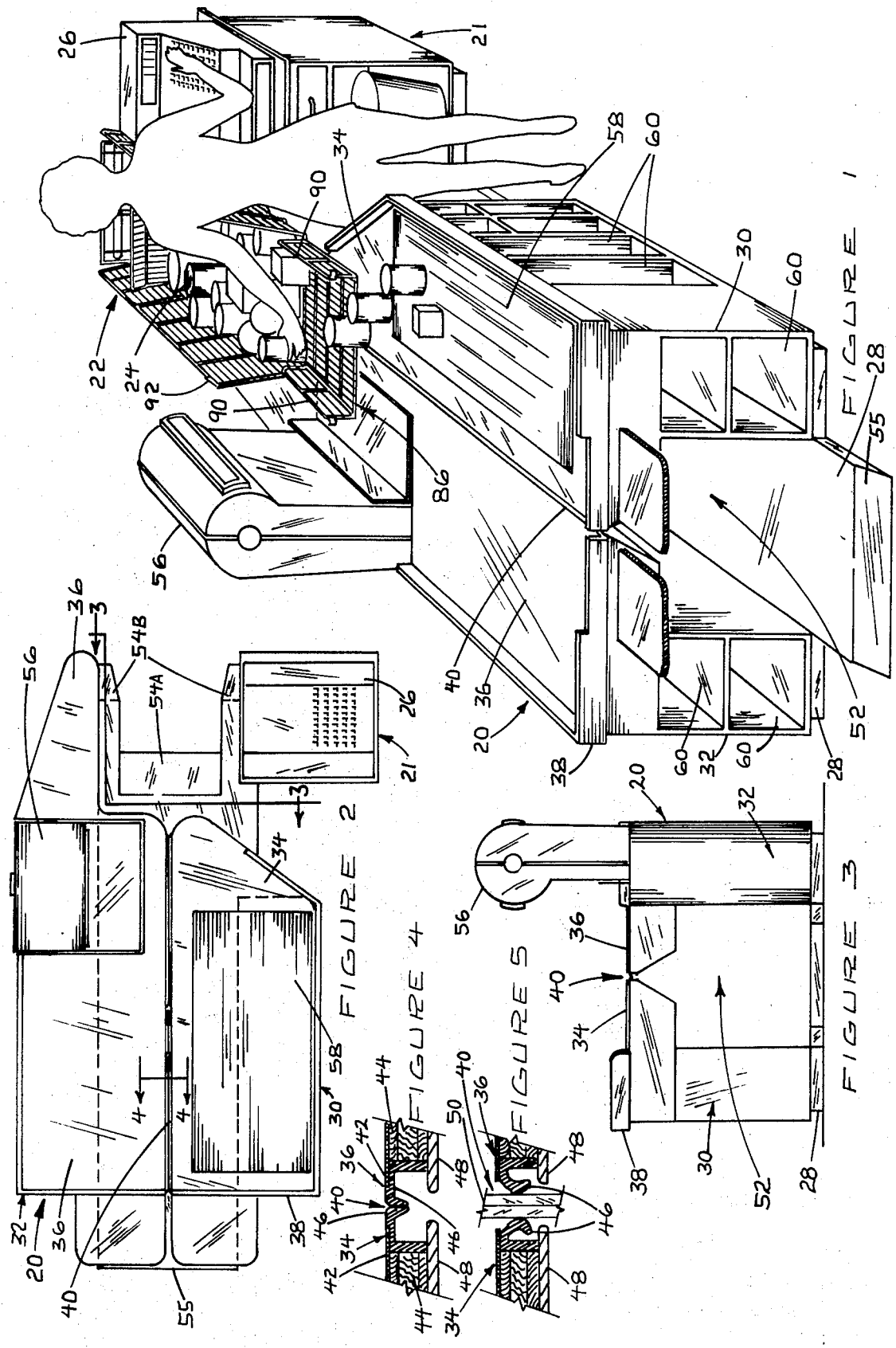

PATENTED FEB 5 1974 3,789,957
SHEET 2 OF 7
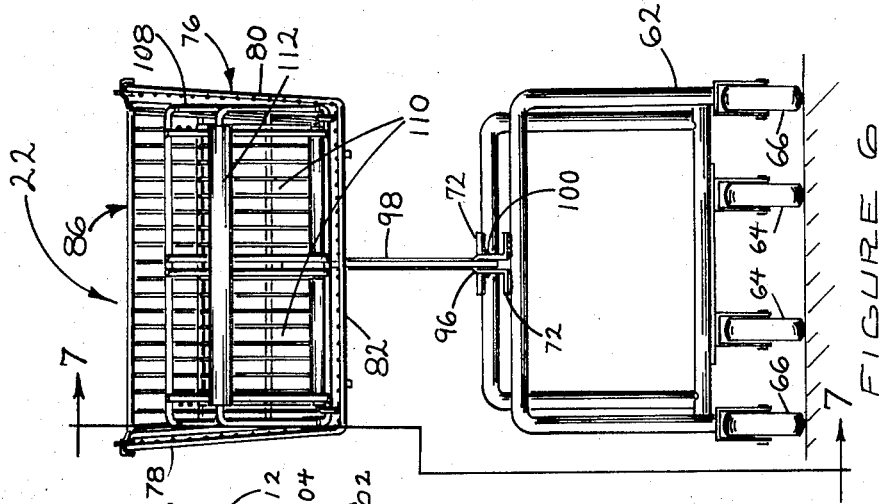
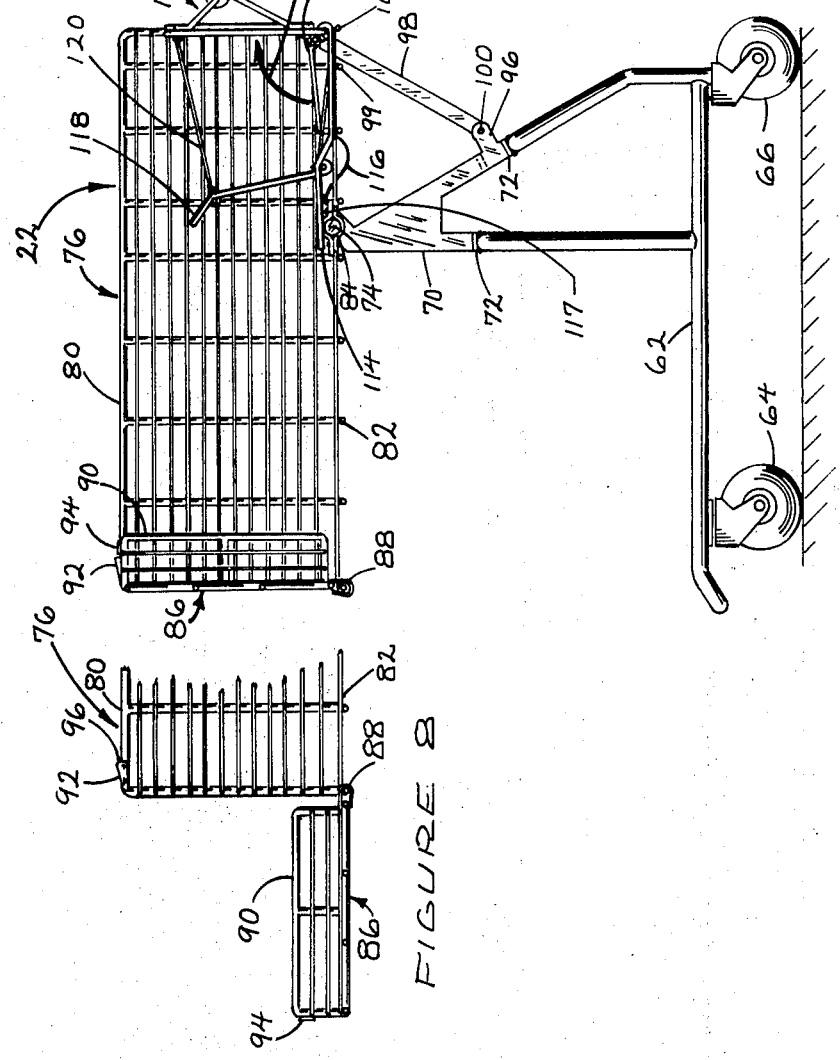

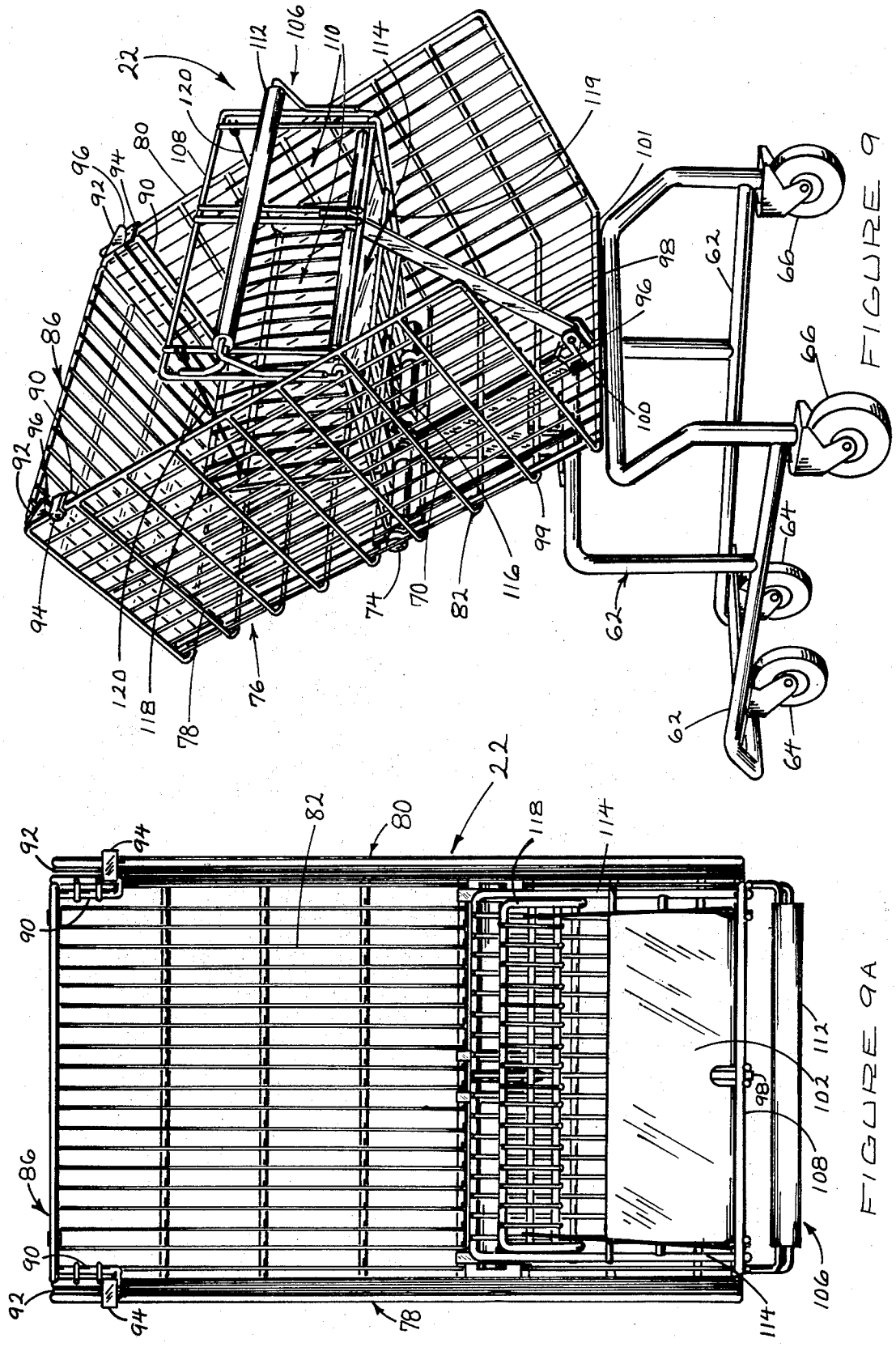

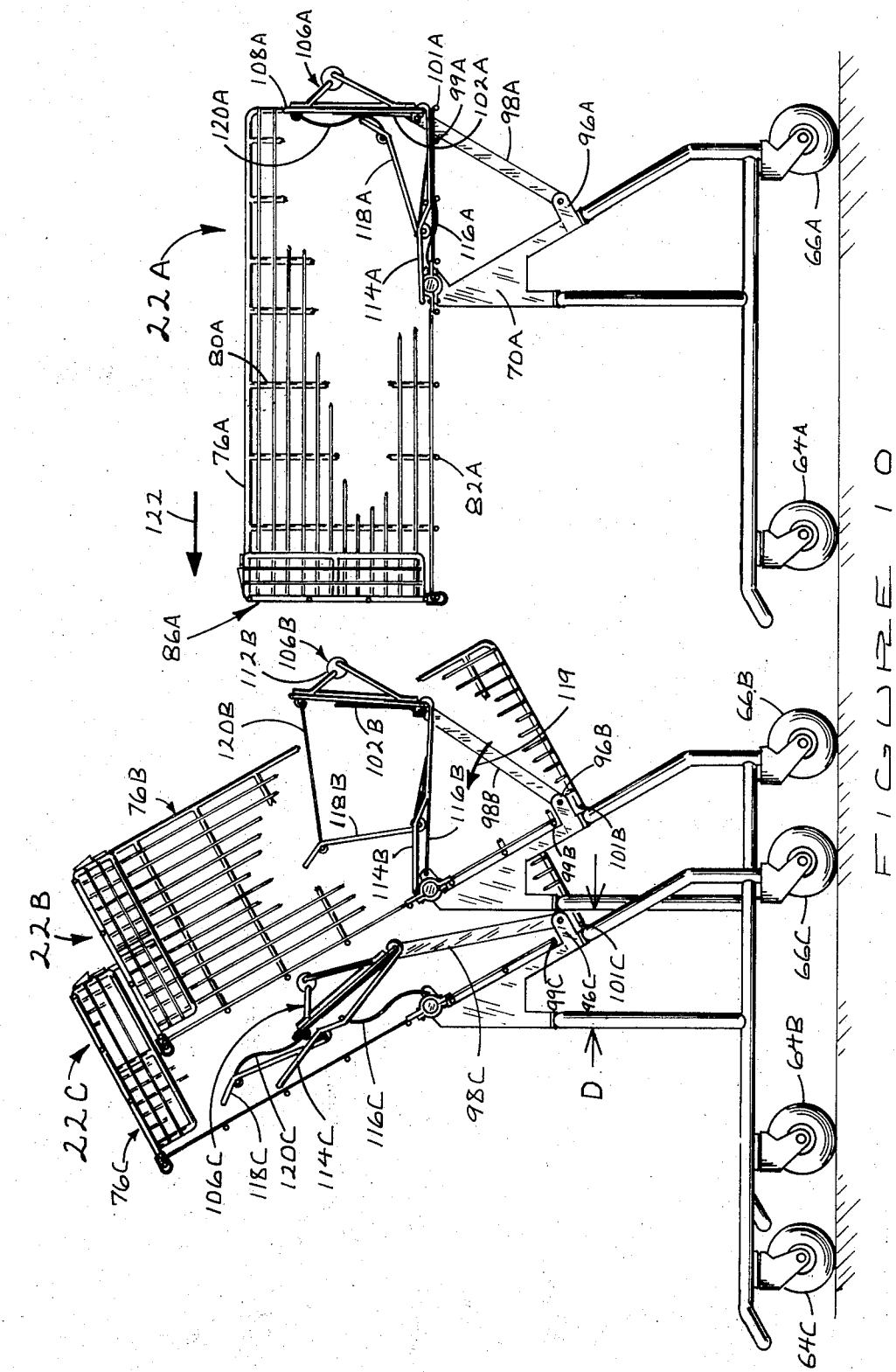

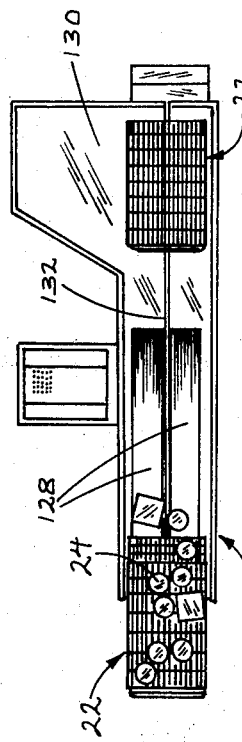
FIGURE 14
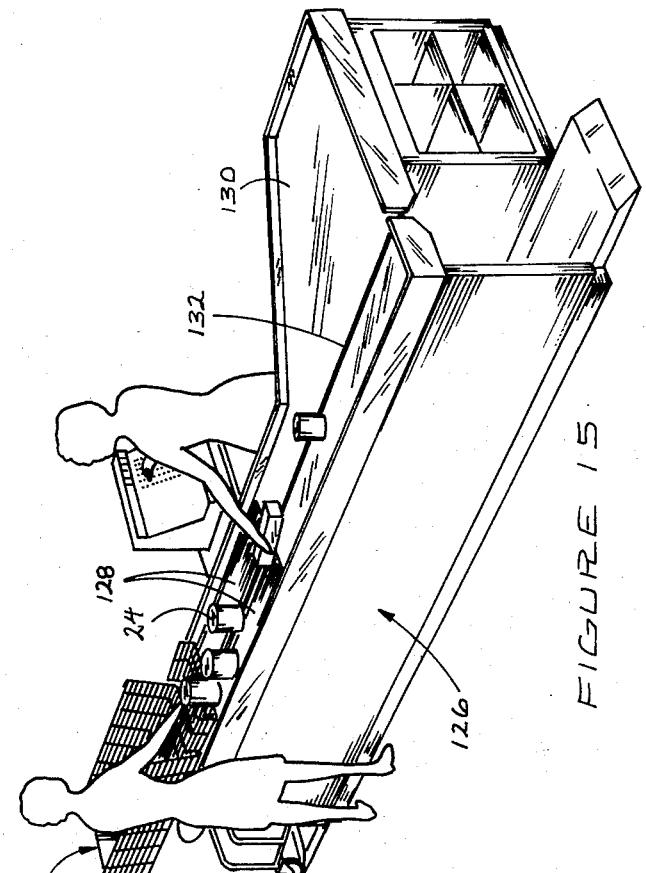
FIGURE 15
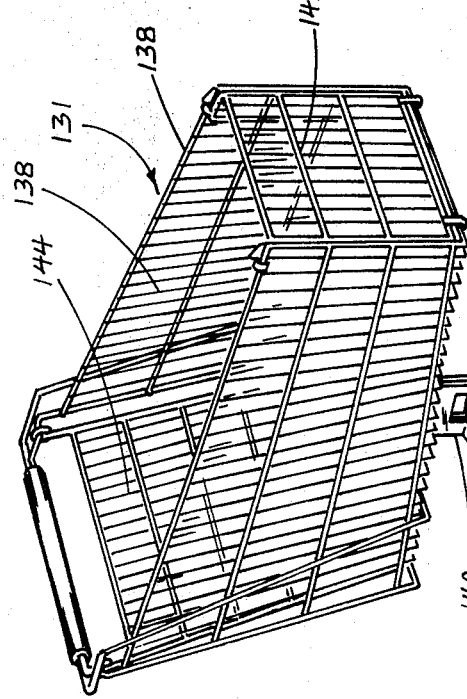
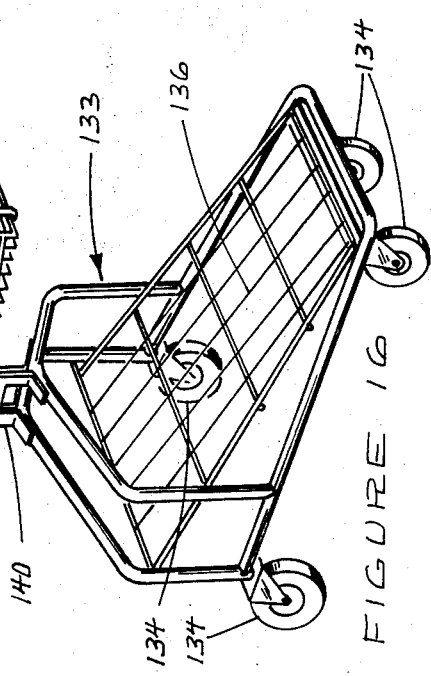
FIGURE 16

CHECK OUT SYSTEM

BACKGROUND OF THE INVENTION

The present invention relates to check out systems for retail stores and the like, and more particularly to a check out system wherein cooperating check out carts and counters are used, wherein the cart does not pass through the customer's isle or the checker's work area during the check out process and wherein the upper basket portion of the cart is supported above the work surface of the check out counter during the check out operation and is movably supported over said counter by the cooperation of the cart and the counter itself.

DESCRIPTION OF THE PRIOR ART

In the early days of self-service retail stores such as grocery stores, department stores and the like, portable baskets were furnished to the customers to carry about the store and fill with merchandise, as desired. Once the merchandise has been selected, the customer would carry the basket to the check out station, the loaded basket being placed on the counter top for convenience of the clerk in tabulating the price of the merchandise and receiving payment from the customer. Then, the basket was moved over the counter to a storage area in the vicinity of the check out clerk for re-use by the next customer.

As the size of the baskets increased, it became necessary to add a wheeled undercarriage to support the baskets due to the customers inability to carry the baskets when fully loaded with merchandise. Due to the addition of this wheeled undercarriage, the advantage of the basket moving over the counter at the check out station was lost. In addition, the wheeled basket itself must be moved through the check out station either by way of the customer's isle or the checker's area, thus increasing the amount of space required for each check out station and decreasing the efficient use of the space within the store itself.

SUMMARY OF THE INVENTION

The general purpose of this invention is the provision of an improved check out system which utilizes a wheeled check out cart with a basket large enough to contain the purchases of the normal shopping tour which cooperates with a check out counter to allow the basket to pass over the counter as in the early days of self-service stores, and also improve the efficiency of operation of the check out process.

To attain this, the present invention contemplates the use of an improved check out counter and cart assembly in which the upper basket of the cart is supported above the work surface of the check out counter without the cart having to pass either on the customer or checker's side of the check out counter and is provided with an access door for allowing easy removal of merchandise from the cart.

OBJECTS OF THE INVENTION

An object of the present invention is the provision of an improved check out system.

Another object of the present invention is the provision of an improved check out cart.

A further object of the present invention is the provision of an improved check out cart which will nest to reduce the storage space required.

Another object of the present invention is the provision of an improved check out system wherein the basket of the check out cart passes over the surface of the check out counter.

Still another object of the present invention is the provision of an improved check out cart which is stable during use.

Yet another object of the present invention is the provision of an improved check out cart with an infant seat thereon which folds to increase the amount of merchandise contained in the cart.

A still further object of the present invention is the provision of an improved cart which has an improved access door in the side thereof for allowing removal of the merchandise from the cart.

Other objects and many of the attendant advantages of the invention will be readily appreciated by those skilled in the art as the same becomes better understood by reference to the following detailed description, when considered in connection with the accompanying drawings in which:

BRIEF DESCRIPTION OF THE DRAWINGS

FIG. 1 illustrates the perspective view of the cart and counter system of the present invention with the cart in the unloading position;

FIG. 2 illustrates a plan view of the counter assembly of the present invention;

FIG. 3 shows a section of the device taken on line 3—3 of FIG. 2, looking in the direction of the arrows;

FIG. 4 shows a section of the device taken on line 4—4 of FIG. 2, looking in the direction of the arrows;

FIG. 5 is a view similar to FIG. 4 illustrating the upstanding support portion of the cart of the present invention in the groove;

FIG. 6 is a rear elevation of the cart of the present invention;

FIG. 7 shows a section of the cart taken on line 7—7 of FIG. 6, looking in the direction of the arrows;

FIG. 8 is a view similar to FIG. 7 illustrating the door of the upper basket assembly in the open position;

FIG. 9 is a perspective view of the cart of the present invention;

FIG. 9A is a plan view of the cart of the present invention;

FIG. 10 illustrates the side elevation view partly in section of a plurality of carts in the nesting position;

FIGS. 14 and 15 are perspective views of alternate counter configurations of the present invention; and FIG. 16 is a perspective view of an alternate configuration of a cart.

DESCRIPTION OF THE PREFERRED EMBODIMENTS

Figure 12:
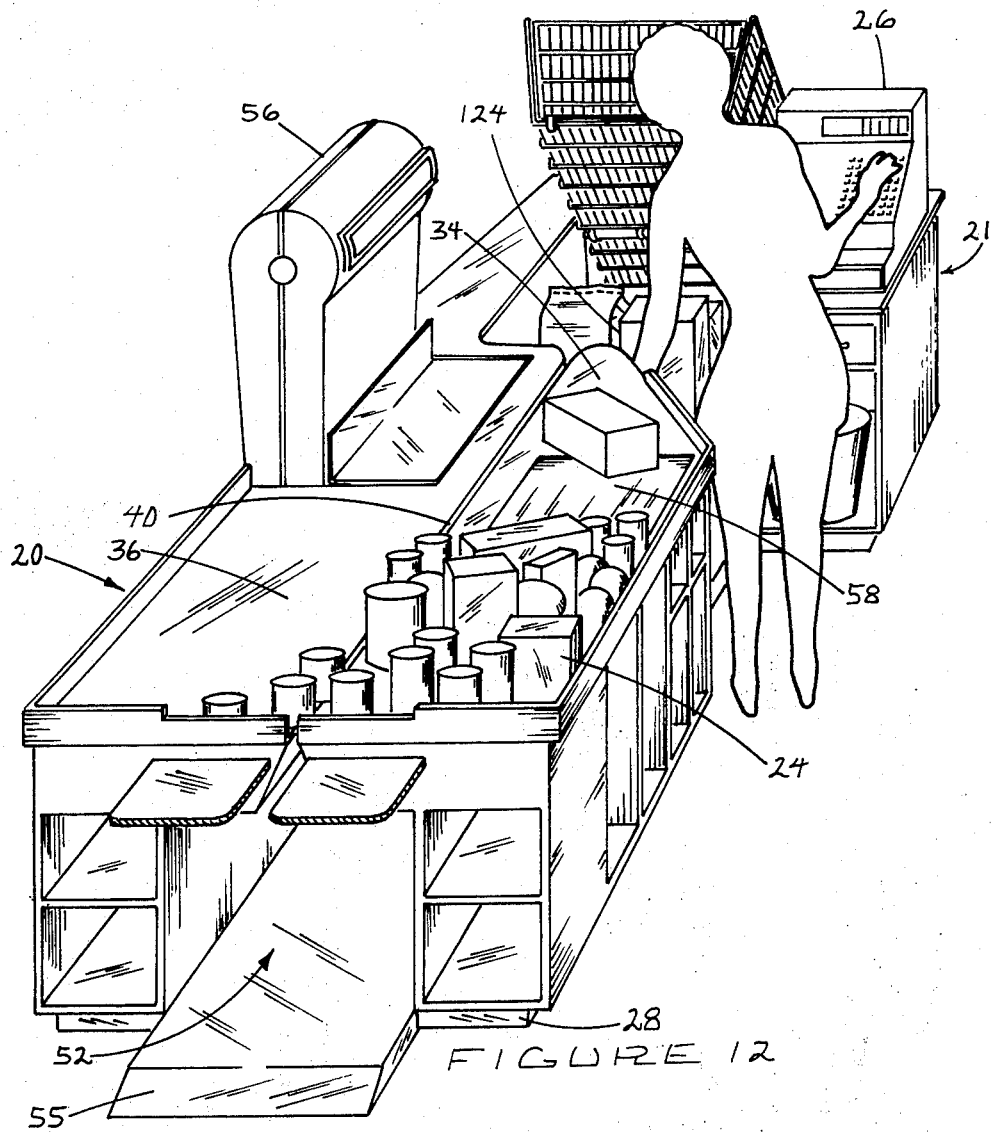
FIGS. 12 and 13 are perspective views of the counter and cart of the present invention illustrating the cart in various positions with respect to the counter.

Referring now to the drawings, wherein like reference characters designate like or corresponding parts throughout the several views, there is shown the improved check out system of the present invention having a check out counter assembly 20, a cash register stand assembly 21, and a unique merchandise cart 22. In operation, a customer entering a retail store such as a grocery store or the like selects a merchandise cart 22 and moves it through the store, selecting merchandise 24 and placing the merchandise in the cart, as desired. Once the selection of the merchandise is complete, the customer then moves the cart to the position shown in FIG. 1 adjacent the check out counter assembly 20, whereupon an employee of the store will remove the merchandise from the cart 22 and place it on the check out counter assembly 20, while tabulating the price of the merchandise on a cash register 26.

DESCRIPTION OF CHECK OUT COUNTER

As can be seen in detail in FIGS. 1, 2, and 3, the check out counter assembly 20 has a frame with a base 28 which rests on the floor, as shown. Attached to and extending up from the base 28 are a pair of support members 30 and 32. The upper surfaces 34 and 36, respectively, of the members 30 and 32 define an elongated counter surface which is located at a convenient work height. This counter surface, formed by surfaces 34 and 36, is bordered by an upstanding flange 38 which reduces spillage of merchandise over the edges of the counter.

The check out counter assembly 20 is also provided with a groove 40 which extends along the length of the counter assembly 20 and separates the surfaces 34 and 36. A detail of a section of the groove is shown in FIG. 4 with each of the counter surfaces 34 and 36 being formed from a laminated material wherein an upper layer of the counter surface is of wear resistance material 42 such as stainless steel, aluminum or other suitable materials. This material 42 is attached to and supported from a wooden member 44 which has a pair of resilient seals 46 attached to its edges which bridge across the width of the groove 40 and extend along the length thereof, as shown in FIG. 4. A pair of guides 48 are attached to the underside of the wooden members 44 to extend along the length of the groove to guide a portion of the cart 22 through the groove 40, as will hereinafter be described in detail. In FIG. 5 a portion of the groove 40 is illustrated with a portion 50 of the cart 22 positioned between the guides 48 and deforming the seals 46, as shown, to allow the portion 50 to move through the groove 40.

Located below the groove 40 is a clearance area 52 which extends along the length of the check out counter assembly 20. This clearance area 52 is of a size to allow the undercarriage of a cart 22 to pass therethrough, as will be hereinafter described. As can be seen, the undercarriage of the cart will be supported on the base 28 while it passes through the clearance area 52. To facilitate elevation of the cart wheels upon the base 28, ramp structures 54 and 55 are provided at the front and rear ends, respectively, of the check out counter assembly 20. The front ramp structure 54 is provided with a central ramp surface 54a which is positioned adjacent the counter 20. A pair of spaced side ramp surfaces 54b are also provided spaced in front of the surface 54a. It is also to be noted that a portion of the base 28 extends from the check out counter assembly 20 adjacent the cash register stand assembly 21, as shown in FIG. 2.

The check out counter assembly 20 can also be provided with a scale 56 for weighing items such as produce and a selectively controlled conveyor assembly 58 for moving the merchandise along the counter surface. Additionally, the support members 30 and 32 of the counter assembly 20 can be provided with a plurality of storage areas 60 in which bags and other items may be stored for use by the checker.

DESCRIPTION OF MERCHANDISE CART

By referring to FIGS. 6, 7, 8, 9, 9A, and 10, the cart 22 will be described in detail. The cart 22 is provided with an undercarriage assembly 62 which is formed from tubular metallic materials bent to the shape shown and welded together to form a rigid structure. Two front wheels 64 are attached adjacent the front end of the undercarriage 62 so that they can rotate as the cart passes over the floor and can pivot about a vertical axis to assist in steering the cart. The two rear wheels 66 are attached adjacent the rear end of the undercarraige 62 and are shown as being of the type which will freely rotate over the floor, but will not pivot about a vertical axis. It is envisioned, of course that the rear wheels 66 could be of the type which pivot about a vertical axis, but for purposes of description of the present invention, they have not been shown as such. An upstanding member 70 is attached to the undercarriage 62 by flanges 72. In the present embodiment these flanges 72 are welded to the undercarriage 62, but it is envisioned, of course, that other types of fasteners could be used.

Attached to the upper end of the upstanding member 70 is a transversely extending rod 74 to which is pivotably attached the upper basket portion 76. The upper basket portion 76 is positioned so that the center of gravity of the upper basket portion 76 (unloaded) is offset from the rod 74 a short distance so that the basket tends to remain in the horizontal position. This upper basket portion 76 is formed with two side walls and a bottom wall 78, 80, and 82, respectively, which are integrally formed from a plurality of transversely extending stainless steel wires which are welded together and bent to form a rigid structure, as shown. It is to be noted that the bottom wall 82 has a socket 84 formed thereon for receiving the rod 74 therein to allow the upper basket portion 76 to rotate about the rod 74, as is hereinafter described.

One end of the upper basket portion 76 is provided with a door assembly 86 which moves between the closed position shown in FIG. 7 and in the open position shown in FIGS. 1 and 8. This door 86 is pivotably attached to the upper basket portion 76 at 88 so that the door will swing as shown. Attached to the sides of the door 86 and extending transversely thereto are a pair of side walls 90 which help prevent merchandise from falling over the sides of the door 86 when it is in the position shown in FIGS. 1 and 8. The door 86 is releaseably held in the closed position shown in FIG. 7 by means of a latch assembly which comprises a ramp-like structure 92 which is attached to the upper edge of the side walls 78 and 80 adjacent the upper edge thereof. A cooperating tab 94 is attached to both side walls 90 to slide up the inclined surface of the ramp 92 as the door 86 is closed and to latch over the shoulder 96 as shown in FIG. 7. Thus, it can be seen that the door will automatically latch upon closing and can be opened easily by lifting the door 86 and then rotating it down to the position shown in FIG. 8.

DESCRIPTION OF INFANT SEAT

A bifurcated portion 96 is provided on the undercarriage 62 for pivotably attaching a support member 98 by means of a pin 100. This suport member 98 extends up through the bottom 82 between structural elements 99 and 101 to limit the rotation of the basket 76 in the downward direction.

Pivotably attached to the upper end of the support member 98 is a bottom portion 102 of an infant seat. This bottom portion 102 provides a flat surface upon which the infant rests when the infant seat is in use. The portion 102 is resiliently urged by means not shown in the direction of the arrows 104 to rotate from the position shown in FIGS. 7 and 9A to the position shown in FIG. 10 as 102A and 102B. By assembling the infant seat with the bottom portion 102 urged in the direction of the arrows 104, the bottom portion 102 will rotate to the upper position to provide a rear wall for the upper basket portion 76 to assist in preventing merchandise carried in the basket portion 76 from falling from the cart.

Rigidly attached to the support member 98 adjacent the bottom portion 102 is a handle assembly 106. This handle assembly 106 has a frame portion 108 which extends from the support member 98 at an angle thereto, and is provided with a pair of openings 110 for the legs of the infant when the infant seat is in use. Additionally, the handle assembly 106 is provided with a handle 112 which extends across the width of the cart 22, and is spaced away from the frame portion 108. This handle 112 provides a place where the customer can push and steer the cart, as desired. It is to be noted that, due to the fact that the member 98 extends up between the elements 99 and 101, the infant seal will not collapse when force is applied to the handle 112 while the cart is in the position shown in FIG. 7. This is due to the fact that the member 98 will contact the element 99 and will be prevented from moving forward thereby.

A bottom frame assembly 114 is pivotably attached to the frame portion 108 and lays parallel to and rests on the bottom wall 82 of the upper basket portion 76. A plurality of flexible tether cords 116 are attached with one end of each attached to flange 117 on the basket portion 76 adjacent the rod 74. The other ends of these tether cords 116 are attached to the bottom frame assembly 114 to hold the infant seat in position for use when the upper basket portion 76 is rotated, as shown in FIGS. 9 and 10. Because of these tether cords 116, an infant can remain in the infant seat as the upper basket portion 76 is rotated to remove merchandise from the undercarriage assembly.

A back rest assembly 118 is attached to the bottom frame 114 to rotate between the position shown in FIGS. 7 and 9 and the position shown in FIG. 10 as 118A. This back rest assembly is constructed from wire members which are welded together and forms a support for the back of the infant when the infant seat is in use. The back rest assembly 118 is held in position by a plurality of flexible tether cords 120 which have one end attached to the upper end of the back rest assembly 118 and the other end attached to the upper frame portion 108. By assembling the infant seat in this manner, the back rest assembly can be rotated to the position as shown in FIG. 10 as 118A wherein the infant seat is not in use and the back rest assembly is folded down adjacent the bottom of the upper basket portion to provide additional space in the upper basket portion for merchandise.

DESCRIPTION OF NESTING

The nesting of the carts 22 will be described by reference to FIG. 10 wherein three separate carts are illustrated and identified by reference numerals 22A, 22B, and 22C. The cart 22A is shown prior to nesting with the infant seat folded to the non-use position. The cart 22B is shown with the upper basket portion 76B rotated up and nested inside the upper basket portion 76C of the cart 22C. The cart 22C is shown with the upper basket portion 76B rotated to the nesting position with the handle assembly 106C and the infant seat folded to the nested position, as shown.

In operation, the cart 22A is moved in the direction of the arrows 122, as shown in FIG. 10, and will contact the handle 112B and will cause the infant seat to collapse. This is due to the fact that the cart 22B is in the position shown in detail in FIG. 9, with elements 99 and 101 rotated below the end of the member 98, thus freeing the member 98 to rotate about the pin 110 in the direction of the arrows 119. Once the seat has collapsed on the cart 22B, the upper basket portion 76A of the cart 22A will rotate to a position similar to the upper basket portion 76B. As can be seen, the nesting distance of the carts are shown in FIG. 10 as dimension (D) which is substantially less than the height of the sides of the upper basket portion itself. This reduced nesting distance is due to the fact that the baskets will rotate up and slide into each other in the nesting position.

DESCRIPTION OF OPERATION OF MERCHANDISE CART AND CHECK OUT COUNTER

Figure 11:
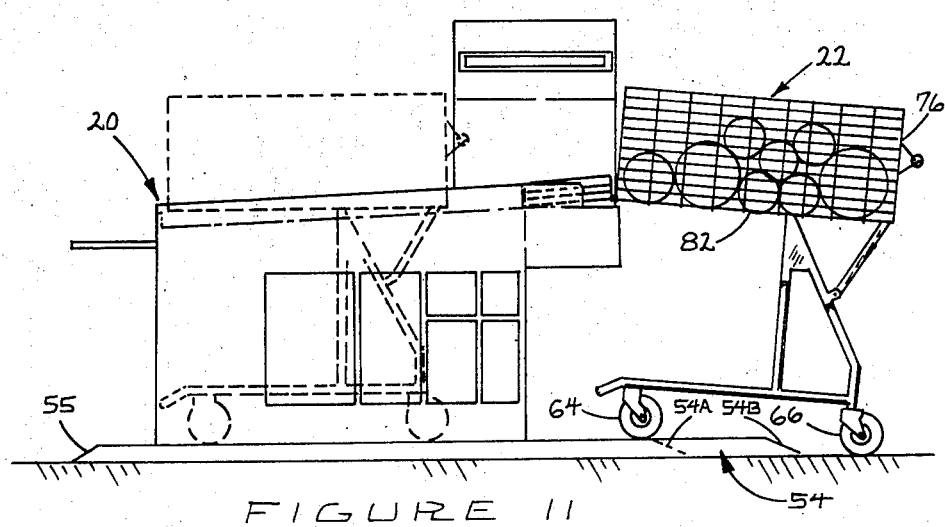
FIG. 11 illustrates a side elevation view of the counter assembly and cart of the present invention in the unloading position.

As can be seen in FIG. 1, the cart 22 is pushed adjacent the check out counter 20 once the customer has completed selecting the merchandise 24. The door 86 is then lowered and the merchandise is removed by the store employee, as shown. In FIG. 11 it can be seen that when the cart 22 is in the position shown, the front wheels 64 will be resting on the front wheel ramp surface 54A so that the bottom 82 of the upper basket portion 76 will be inclined away from the door 86, thus tending to retain the merchandise 24 in the basket until it is removed by the store employee. Thereafter, the cart 22 can be moved so that the rear wheels 66 engage and are elevated by the side ramp surfaces 56B to elevate the cart to a level position (as shown in phantom lines in FIG. 11) to allow for removal of merchandise 24 from the undercarriage.

Figure 13:
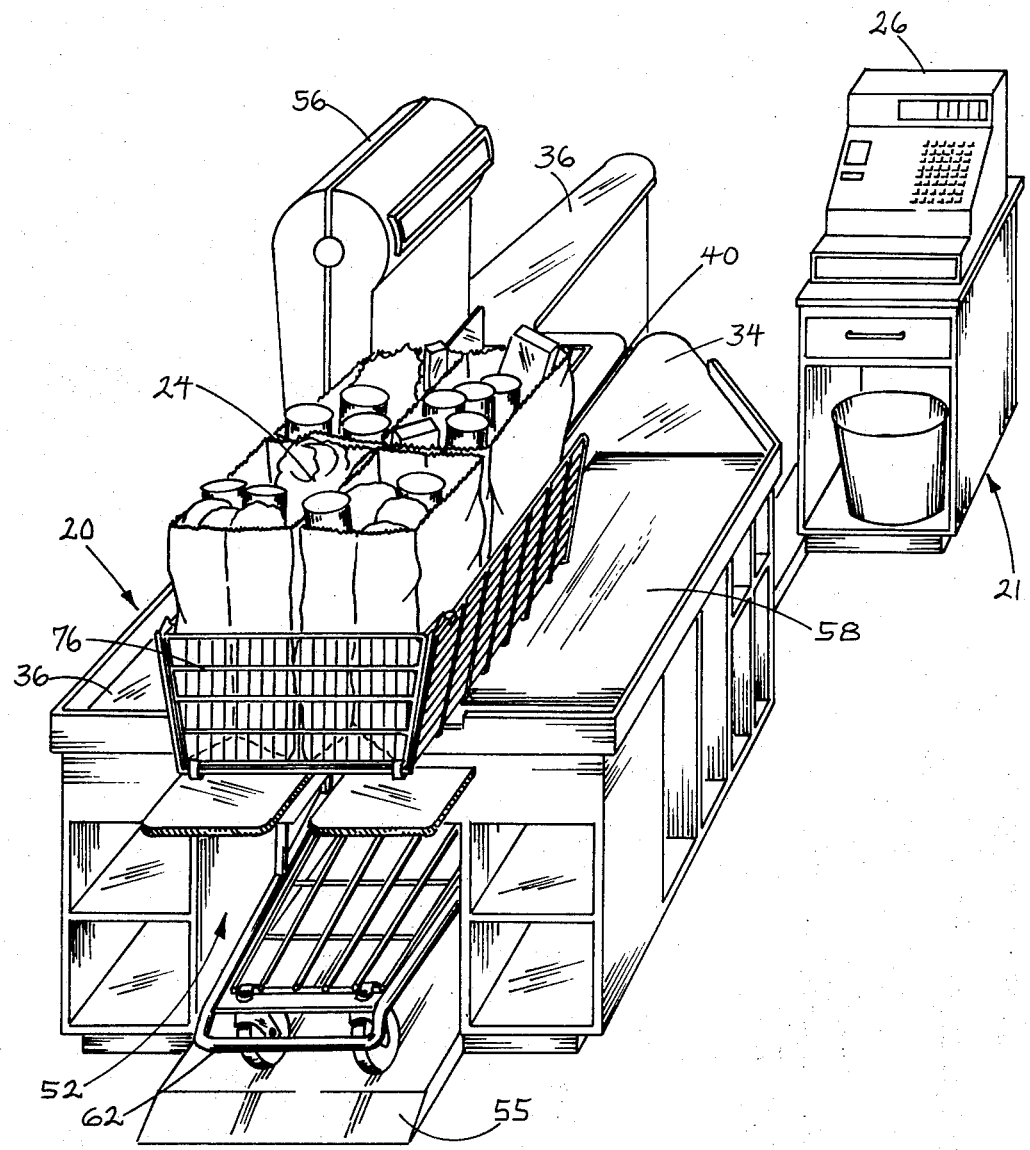

After the merchandise 24 has been removed from the upper basket portion 76, the door 86 is closed and the upper basket portion 76 is rotated up (as shown in FIG. 12) to allow for easy access and removal of merchandise 24 from the undercarriage assembly 62. Once all the merchandise has been removed from the cart and tabulated by the store employee, the upper basket portion 76 can be rotated back down to the horizontal position and the basket can be moved over the counter 58, as shown in FIG. 13, with upstanding member 70 sliding in the groove 40. The merchandise 24 can then be bagged and placed in the cart, whereupon the cart can be moved along the groove 40 with the guides 48 positioning the member 70 without entering the customer's isle or passing through the work area of the store employee. By utilizing the cart in this manner, the efficiency of the checking operation is increased and the amount of the space required for each counter assembly is reduced.

An alternate counter configuration for utilizing the cart 22 is illustrated in FIGS. 14 and 15 and identified by reference numeral 126. With this counter 126 the customer moves the cart 22 adjacent the counter and removes the merchandise 24 and places the merchandise on a conveyor 128 which is selectively controlled by the store employee to move the merchandise along the counter past the cash register assembly to the bagging area 130. In other respects, the counter is similar in construction to the counter assembly 20 and has an elongated groove 132 along which the cart 22 can pass after the merchandise has been removed and while the bagged merchandise is being placed in the cart. Thus, it can be seen that the cart and counter system of the present invention can be used in both customer and store employee unloading situations.

An alternate configuration of the cart is shown in FIG. 16. This cart 131 is very similar in construction to the carts commonly found available in supermarkets and the like, and is provided with an undercarriage portion 133 which has a plurality of wheels 134 attached thereto. The undercarriage 133 is provided with a shelf or a basket portion 136 for transporting merchandise. The upper basket portion 138 is attached to the undercarriage portion 133 by means of a narrow upstanding member 140, which is of a size to move through the groove in the check out counter assembly, as previously described. This upper basket portion 138 can be provided with a door 142 identical in structure to the door 86 previously described. The rear of the upper basket portion 138 can be provided with an additional door 144 which pivots up to allow nesting of the basket as is well known in the art.

Various modifications are contemplated and may obviously be resorted to by those skilled in the art without departing from the spirit and scope of the invention as hereinafter defined by the appended claims, as only preferred embodiments thereof have been disclosed.

What is claimed is:

1. In combination,
a cart comprising an undercarriage, a plurality of rotatable wheels mounted on said undercarriage for movably supporting said cart on a floor, a narrow upstanding support means attached to said undercarriage, an upper basket portion positioned over and attached to the upper end of said support means and spaced above said undercarriage, and
counter means comprising surface means for defining an elongated counter surface extending horizontally from a first end of said counter means to a second end of said counter means, said surface means having a slot extending along the length of said counter surface from said first end to said second end of said counter means, and being positioned to provide a portion of counter surface on each side thereof, said slot being substantially narrower in width than said upper basket or said undercarriage and of a size to allow said upstanding support means to slide therethrough from said first end to said second end of said counter means thereby allowing said upper basket portion to pass over both portions of said counter surface, said counter means having a clearance opening therein positioned under said slot and extending from said first end to and through said second end of said counter means, said clearance opening being of a size to allow said undercarriage of said cart to move therethrough.

2. A combination as defined in claim 1 additionally comprising a ramp positioned in said clearance opening for supporting said cart on said rotatable wheels in a position elevated above the floor when said undercarriage is inside said clearance opening.

3. A combination as defined in claim 1 wherein a gate means movable between an open and closed position is provided attached to the upper basket portion for providing access to said upper basket portion.

4. A combination as defined in claim 3 wherein said gate means comprises a portion of at least one side of said upper basket portion, and wherein said gate means rotates about a horizontal axis located adjacent the lower edges of said horizontal side, and wherein said gate is provided with sides which extend transverse to the plane of said gate.

5. A combination as defined in claim 1 wherein said upper basket portion is provided with a foldable infant seat.

6. A combination as defined in claim 1 wherein said slot extends centrally along said counter surface.

7. A combination as defined in claim 1 wherein said cart additionally comprises nesting means for allowing high density storage of said carts.

8. A combination as defined in claim 1 wherein selectively operable conveyor means are mounted in said counter surface.

9. A combination as defined in claim 1 wherein resilient seal means are provided along said slot for sealing said slot when said upstanding support means is removed from said slot.

10. A combination as defined in claim 1 wherein said undercarriage of said cart additionally comprises an auxiliary basket means on said cart for receiving additional merchandise.

11. A combination as defined in claim 10 wherein means are provided on said upper basket portion for allowing rotation thereof about a horizontal axis and for allowing access to said auxiliary basket.

12. A combination as defined in claim 1 wherein said counter surface is located vertically above the floor at a height higher than the lowest point of said upper basket portion, and the improvement which comprises means on said counter for allowing said upper basket portion to pass over said counter surface when said undercarriage of said cart moves through said clearance opening.

13. A combination as defined in claim 1 wherein said upstanding support means is attached to said upper basket at a point adjacent to and vertically below the center of gravity of said upper basket portion.

14. A combination as defined in claim 1 wherein said upstanding support means is attached to said upper basket at a point adjacent to and vertically below the center of said upper basket portion.

15. In combination,
a cart comprising an undercarriage, a plurality of rotatable wheels mounted on said undercarriage for movably supporting said cart on a floor, an upstanding support means attached to said undercarriage, an upper basket portion fixed to the upper end of said support means and spaced above said undercarriage, and a counter for placement on the floor comprising surface means for defining an elongated counter surface elevated above said floor and extending horizontally from a first end of said counter means to a second end of said counter means, a customer side extending along the length of one side of said counter surface for location adjacent a customer occupation area of said floor, a checkout personnel side extending along the length of said counter surface for location adjacent a checkout personnel occupation area, said customer and checkout personnel sides being located on opposite sides of said counter surface, and the improvement which comprises a narrow slot in said counter positioned between said customer and checkout personnel sides to provide a surface on each side of said slot and for allowing said upper basket portion to pass over said counter surface from said first end to said second end while said undercarriage passes under said counter surface and through said counter thereby to allow said cart to pass from said first end to and through said second end while supporting said basket and without extending into or entering said customer or personnel occupation areas.

16. A combination as defined in claim 15 wherein:
said slot extends along the length of said counter surface from said first end to said second end of said counter, said slot being narrower than said upper basket portion or said undercarriage and of a size to allow said upstanding support means to slide therethrough from said first end to said second end of said counter; and a passageway through said counter located under said slot, and extending between said first end to said second end of said counter, said passageway being of a size to allow said undercarriage of said cart to move therethrough.

17. A combination as defined in claim 15 wherein storage means are provided in the personnel side of said counter.

18. A combination as defined in claim 16 additionally comprising a ramp positioned in said passageway for supporting said cart on said rotatable wheels in a position elevated above the floor when said undercarriage is inside said passageway.

19. A counter for use with a cart having an undercarriage, a plurality of rotatable wheels mounted on said undercarriage for movably supporting said cart on said floor, a narrow upstanding support means attached to said undercarriage, an upper basket portion positioned over and attached to the upper end of said support means and spaced above said undercarriage, said counter comprising:

surface means for defining an elongated elevated counter surface extending horizontally from a first end of said counter means to a second end of said counter means, a customer side extending along the length of one side of said counter surface for location adjacent a customer occupation area of said floor, a checkout personnel side extending along the length of said counter surface for location adjacent a checkout personnel occupation area, said customer and checkout personnel sides being located on opposite sides of said counter surface, and a narrow slot in said counter positioned to provide a portion of counter surface on said customer and checkout sides of said slot for allowing said upper basket portion to pass over both portions of said counter surface from said first end to said second end while said undercarriage passes under said counter thereby to allow said cart to pass from said first end to and through said second end without extending into or entering said customer and personnel occupation areas.

20. A counter for use with a cart having an undercarriage, a plurality of rotatable wheels mounted on said undercarriage for movably supporting said cart on a floor, a narrow upstanding support means attached to said undercarriage, an upper basket portion attached to the upper end of said support means and spaced above said undercarriage, said counter comprising:

surface means for defining an elongated elevated counter surface extending horizontally from a first end of said counter means to a second end of said counter means, said surface means having a narrow slot extending along the length of said counter surface from said first end to said second end of said counter means, said slot being narrower than said upper basket portion and said undercarriage and of size to allow said upstanding support means to slide therethrough from sand first end to and through said second end of said counter means, said slot extending along the center of said counter surface, said counter means having a clearance opening therein positioned under said slot and extending from said first end to and through said second end of said counter means, said clearance opening being of a size to allow said undercarriage of said cart to move therethrough and out of said opening.

* * * * *

UNITED STATES PATENT OFFICE
CERTIFICATE OF CORRECTION

Patent No. 3,789,957　　　　　Dated February 5, 1974

Inventor(s) James Garth Close

It is certified that error appears in the above-identified patent and that said Letters Patent are hereby corrected as shown below:

Col. 5, line 4, after "This" and before "member", change "suport" to --support--.

Col. 5, line 34, after "infant" and before "will", change "seal" to --seat--.

Col. 6, line 22, change "pin 110" to --pin 100--.

Col. 10, line 42, after "from" and before "first", change "sand" to --said--.

Signed and sealed this 11th day of June 1974.

(SEAL)
Attest:

EDWARD M. FLETCHER, JR.　　　　　C. MARSHALL DANN
Attesting Officer　　　　　　　　Commissioner of Patents